Patented June 21, 1949

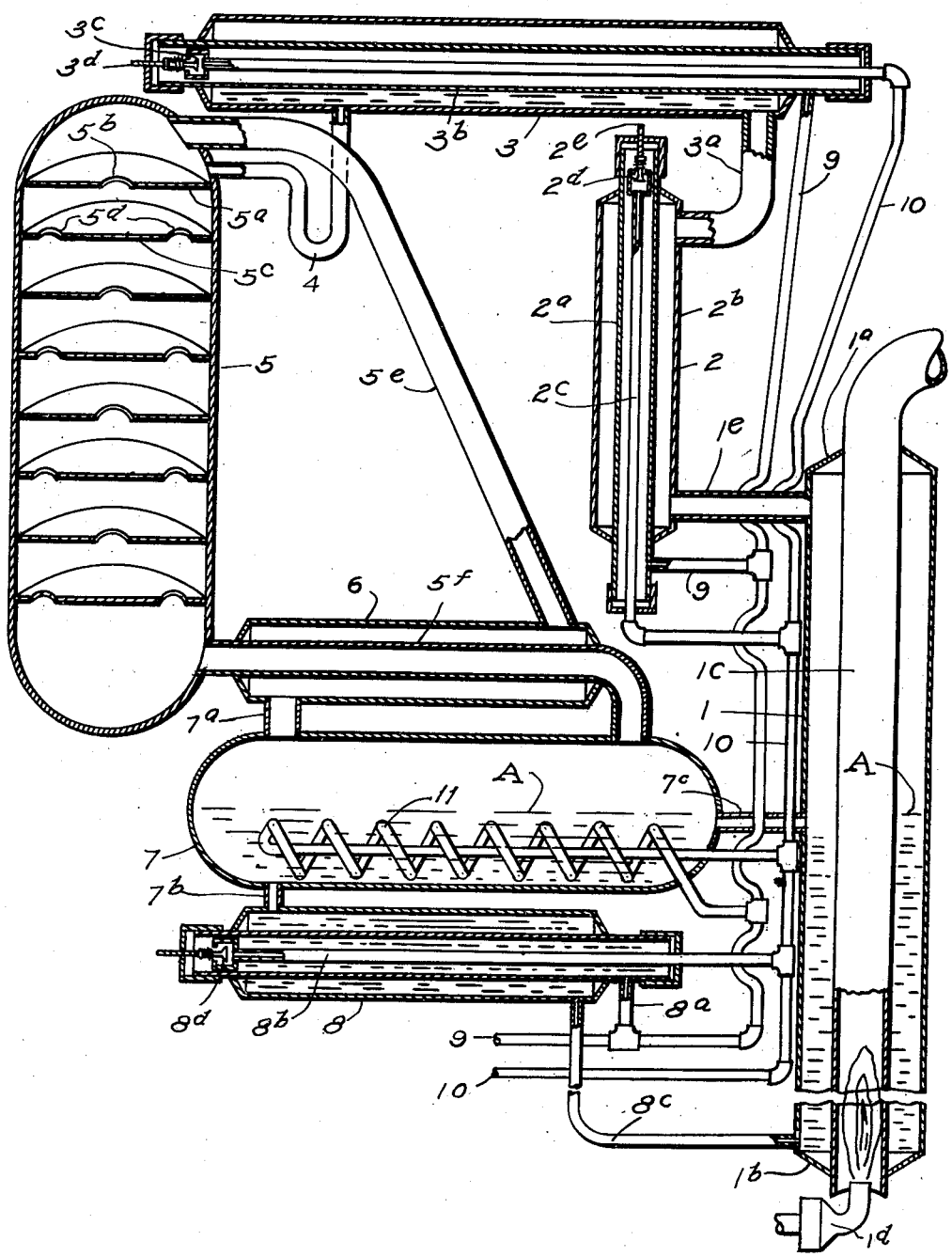

2,473,730

UNITED STATES PATENT OFFICE 2,473,730

REFRIGERATING MEANS

John F. Saye, Powersite, Mo.

Application April 23, 1947, Serial No. 743,405

5 Claims. (Cl. 62—119.5)

My invention relates to a refrigerating means, more particularly of the continuous absorption type, and the objects of my invention are:

First, to provide a means of this class which is fabricated by welding the various connections providing an airtight unit which is relatively leakproof;

Second, to provide a refrigerating means of this class in which the fluids are circulated by gravity and temperature and do not require the operation of a mechanical pump;

Third, to provide a refrigerating means of this class in which the fluid circulates and performs its function at one level;

Fourth, to provide a refrigerating means of this class employing novel circulation control means for gravitating the fluid at certain levels;

Fifth, to provide a novel method of refrigeration;

Sixth, to provide a refrigerating means of this class which is particularly adaptable for use in ocean going vessels where the supply of cool water is unlimited; and Seventh, to provide a refrigerating means of this class which is very simple and economical of construction, efficient in its action and which will not readily deteriorate or get out of order.

With these and other objects in view as will appear hereinafter, my invention consists of certain novel features of construction, combination and arrangement of parts and portions, and a certain method, as will be hereinafter described in detail and particularly set forth in the appended claims, reference being had to the accompanying drawings and to the characters of reference thereon which form a part of this application.

The figure of the drawing is a side elevational view of my refrigerating means showing portions thereof broken away and in section to amplify the illustration.

Similar characters of reference refer to similar parts and portions throughout the view of the drawing.

The generator 1, rectifier 2, condenser 3, trap 4, evaporator 5, heat exchanger 6, absorber 7, fluid cooler 8, cold water tubes 9, and return water tubes 10 constitute the principal parts and portions of my refrigerating means.

The generator 1 can be any type of boiler that is used to generate steam and is a hollow tubular member enclosed at opposite ends 1a and 1b along the heating tube 1c in the lower end of which is positioned the burner 1d. This generator 1, around the outer side of the heating tube 1c, contains a mixture of water and ammonia in liquid form rising to the level A and also shown in the absorber 7. Communicating with the upper end of this generator 1 through the tube 1e is the rectifier 2 which is arranged to separate water from the gaseous ammonia rising to the condenser 3. This rectifier 2 is provided with an internal tubular member 2a around which the external tubular member 2b is welded in airtight relationship therewith. The internal tube 2a is a heat exchanger tube provided with a cold water inlet tube 9 which communicates with the interior of said inner tubular member arranged to conduct cold water into said internal tubular member 2a for cooling the fluid surrounding the same whereby water therein is condensed and is returned to the generator through the tube 1e.

It will be here noted that the water outlet tube 2c is preferably made of brass or other material having a higher coefficient of expansion than the tubular members 2a and 2b whereby the valve 2d is opened when the cold water is heated a certain amount permitting the passage of cold water from the interior of the tubular member 2a into the outlet tube 2c and through the return water tube 10.

It will be here noted that the valve 2d is a throttling valve and operates to effect a temperature differential between the fluids in accordance with the discrepancy in coefficient of expansion between the inner tubular member 2a and the outlet tube 2c. The relative elongation of the outlet tube 2c causes the valve 2d to open permitting more cold water to enter through the cold water tube 9. The upper end of the rectifier tube 2b is connected with the condenser 3 by means of a communicating tube 3a for conducting ammonia vapor into the condenser 3.

It will be here noted that the condenser 3 functions in a similar manner to the rectifier 2 wherein cold water passes into the inner tube 3b through the cold water tube 9 and then outwardly through the return water tube 10 after cooling the tubular member 3b and condensing the ammonia at the outer side thereof in the condenser 3.

It will be here noted that the valve 2d in the rectifier 2 and the valve 3c in the condenser 3 may be adjusted by means of the screws 2e and 3d, respectively.

When the ammonia is condensed into liquid form it passes downwardly through the trap 4 and into the evaporator over the upper plate 5a which is provided with a central opening 5b. Positioned below this plate 5a is another plate 5c having separate holes 5d near the periphery thereof. These plates 5a and 5c are arranged in alternate relationship to each other whereby the liquid ammonia is thoroughly circulated in the evaporator 5 as it passes downwardly toward the absorber 7. The ammonia in the evaporator 5 is evaporated in the hydrogen medium which passes upwardly through the tube 5e to the top of the evaporator 5. As the hydrogen passes downwardly through the plates 5a and 5c together with the ammonia, the ammonia is evaporated and the mixture of ammonia and hydrogen passes through the outlet tube 5f communicating with the upper side of the absorber at one end thereof and into the absorber 7 above the liquid surface A which is the aqueous ammonia solution. The ammonia and hydrogen mixture as it passes into the absorber 7 through the tube 5f travels from one end of the absorber to the other over the surface of the aqueous ammonia solution wherein the ammonia is absorbed and the hydrogen is liberated and passes through the communicating tube 7a to the heat exchanger 6 from which the hydrogen rises through the tube 5e and then passes into the upper portion of the evaporator providing a continuous hydrogen cycle which first evaporates the ammonia, then carries the same to the absorber and returns to evaporate the oncoming ammonia passing in liquid form from the condenser 3.

Communicating with the lower side of the absorber 7 through the tube 7b is the fluid cooler 8 which operates in substantially the same manner as the rectifier and the condenser. This fluid cooler 8 is provided with a cold water inlet 8a communicating with the cold water tubes 9 which supplies cold water to the outer side of the outlet tube 8b which cools the fluid passing from the absorber 7 and gravitates the same to the lower inside of the generator 1 through the communicating tube 8c.

It will be here noted that the valve 8d operates in substantially the same manner as the valves 2d and 3d of the rectifier and condenser, respectively.

The operation of my refrigerating method is substantially as follows:

The aqueous ammonia solution in the generator 1 is heated by means of the burner 1b and the ammonia is evaporated and passes up through the rectifier 2 wherein the water evaporated therewith is separated therefrom. The pressure created in the generator 1 and communicating system compresses the ammonia in the condenser 3 while the cold water therein cooperates to condense the ammonia into liquid state. The ammonia then passes in liquid state through the trap 4 and into the evaporator 5 wherein it is evaporated in the presence of hydrogen. The mixture of hydrogen and ammonia is then conducted to the absorber containing solution of aqueous ammonia wherein the ammonia is absorbed into the liquid and the hydrogen passes upwardly into the heat exchanger and then to the evaporator 5 for further evaporation of ammonia. The ammonia after being absorbed into the liquid is then cooled and gravitated by the fluid cooler 8 to the lower interior of the generator 1. The heat exchanger tube 11 is disposed in coiled form in the absorber 7 and opposite ends of this tube 11 communicate with the tubes 9 and 10 for the conductor of cooling medium into and out of the tube 11 for cooling the liquid in the absorber.

The tube 7c intercommunicating with the generator 1 and the absorber 7 provides communication of fluid in the absorber with that in the generator. Ammonia passing into the absorber is picked up by the weak fluid from the top of the generator which moves into the absorber through said tube 7c. When the weak fluid moves into the absorber and picks up ammonia in the ammonia hydrogen mixture, it returns the ammonia to the generator where it is driven off from the water in the form of vapor and passes through the refrigerating cycle of the condenser evaporator and back to the absorber. The heat exchanger 8 keeps the fluid in motion and in this manner the tube 7c provides a second tubular conductor permitting from the generator to the absorber so that the weak liquor from the top of the generator may be strengthened in the absorber and returned to the generator through the heat exchanger 8 and tube 8c at the lower end thereof.

Though I have shown a particular construction, combination and arrangement of parts and portions and described a particular method, I do not wish to be limited to this particular construction, combination and arrangement, nor to the method as described, but desire to include in the scope of my invention the construction, combination and arrangement and the method substantially as set forth in the appended claims.

Having thus described my invention, what I claim as new and desire to secure by Letters Patent is:

1. In a refrigerating means of the class described the combination of a generator containing aqueous ammonia, a heater for said generator, a rectifier above said generator and communicating therewith having cold water inlet means and a thermostatic throttling outlet valve arranged to provide indirect heat conduction from ammonia to said water, a condenser communicating with the upper end of said rectifier having cold water inlet and thermostatic throttling valve outlet for cooling ammonia therein by indirect thermal conduction of heat from said ammonia to said water.

2. In a refrigerating means of the class described the combination of a generator containing aqueous ammonia, a heater for said generator, a rectifier above said generator and communicating therewith having cold water inlet means and a thermostatic throttling outlet valve arranged to provide indirect heat conduction from ammonia to said water, a condenser communicating with the upper end of said rectifier having cold water inlet and thermostatic throttling valve outlet for cooling ammonia therein by indirect thermal conduction of heat from said ammonia to said water, said condenser arranged to admit evaporated ammonia having an inner tubular member and an outer tubular member arranged to contain ammonia therebetween, a cold water inlet communicating with the interior of said inner tubular member and thermostatic throttling valve means controlling the outlet of said water.

3. In a refrigerating means of the class described the combination of a generator containing aqueous ammonia, a heater for said generator, a rectifier above said generator and communicating therewith having cold water inlet means and a thermostatic throttling outlet valve arranged to provide indirect heat conduction from ammonia to said water, a condenser communicating with the upper end of said rectifier having cold water inlet and thermostatic throttling valve outlet for cooling ammonia therein by indirect thermal conduction of heat from said ammonia to said water, said condenser arranged to admit evaporated ammonia having an inner tubular member and an outer tubular member arranged to contain ammonia therebetween, a cold water inlet communicating with the interior of said inner tubular member and thermostatic throttling valve means controlling the outlet of said water, an evaporator having a communicating tube communicating with the interior of said condenser and containing hydrogen gas for evaporating ammonia therein.

4. In a refrigerating means of the class described the combination of a generator containing aqueous ammonia, a heater for said generator, a rectifier above said generator and communicating therewith having cold water inlet means and a thermostatic throttling outlet valve arranged to provide indirect heat conduction from ammonia to said water, a condenser communicating with the upper end of said rectifier having cold water inlet and thermostatic throttling valve outlet for cooling ammonia therein by indirect thermal conduction of heat from said ammonia to said water, said condenser arranged to admit evaporated ammonia having an inner tubular member and an outer tubular member arranged to contain ammonia therebetween, a cold water inlet communicating with the interior of said inner tubular member and thermostatic throttling valve means controlling the outlet of said water, an evaporator having a communicating tube communicating with the interior of said condenser and containing hydrogen gas for evaporating ammonia therein, said evaporator having baffles therein provided with staggered holes in superposed relation to each other.

5. In a refrigerating means of the class described the combination of an evaporator, a condenser containing liquid ammonia communicating with said evaporator, and an absorber communicating with said evaporator wherein hydrogen gas operates in the evaporation of said ammonia and conducts said ammonia to said absorber, said absorber containing aqueous ammonia for the absorption of ammonia from said hydrogen gas, a generator containing aqueous ammonia and having a burner therein, said absorber communicating with said generator slightly below the liquid level in said generator, and a fluid cooler below the liquid level and communicating with said absorber effecting thermal circulation of said aqueous ammonia from said absorber to said generator, said fluid cooler including an inner tubular member and an outer tubular member between which aqueous ammonia circulates, cold water conducting means communicating with the interior of said inner tubular member and thermostatic throttling valve means arranged to control the outlet of said cold water from said inner tubular member.

JOHN F. SAYE.

REFERENCES CITED

The following references are of record in the file of this patent:

UNITED STATES PATENTS

| Number | Name | Date |
| --- | --- | --- |
| 662,690 | Geppert | Nov. 27, 1900 |
| 1,785,700 | Munters | Dec. 16, 1930 |
| 1,830,203 | Lenning | Nov. 3, 1931 |
| 1,985,619 | Persson et al. | Dec. 25, 1934 |